United States Patent [19]

Hayashi et al.

[11] Patent Number: 5,581,762
[45] Date of Patent: Dec. 3, 1996

[54] COMPILING APPARATUS HAVING A FUNCTION TO ANALYZE OVERLAPS OF MEMORY ADDRESSES OF TWO OR MORE DATA EXPRESSIONS AND A COMPILING METHOD

[75] Inventors: Masakazu Hayashi; Tadashi Nakahira, both of Kawasaki, Japan

[73] Assignee: Fujitsu Limited, Japan

[21] Appl. No.: 202,580

[22] Filed: Feb. 28, 1994

[30] Foreign Application Priority Data

May 18, 1993 [JP] Japan .................................. 5-115609

[51] Int. Cl.⁶ .......................................................... G06F 9/44
[52] U.S. Cl. ...................... 395/709; 364/280; 364/280.4; 364/280.5; 364/DIG. 1
[58] Field of Search ........................... 395/700; 364/280, 364/280.4, 280.5, DIG. 1

[56] References Cited

FOREIGN PATENT DOCUMENTS 4-025942 1/1992 Japan.

OTHER PUBLICATIONS

"Hybrid Incremental Alias Algorithms", Thomas J. Marlowe, et al., System Sciences, 1991 Annual Hawaii Int'l. Conference. IEEE Publications.

"A New Kind of Memory for Referencing Arrays and Pointers" Henry Dietz, et al., Supercomputing '88, IEEE Publication.

Aho et al., "10.8 Dealing With Aliases", Compilers: Principles, Techniques, and Tools, Addison–Wesley, Reading, MA, 1986.

Horowitz et al., "Dependence Analysis for Pointer Variables", Proceedings of the ACM Sigplan Symposium on Compiler Construction, Jun. 1989, pp. 28–40.

Landi et al., "A Safe Approximate Algorithm for Interprocedural Pointer Aliasing", Proceedings of the ACM Sigplan '92 Conference on Programming Language Design and Implementation, 1992, pp. 235–248.

Primary Examiner—Kevin A. Kriess
Assistant Examiner—Majid Banankhah
Attorney, Agent, or Firm—Staas & Halsey

[57] ABSTRACT

An object of the present invention is to realize a compiling apparatus producing an object program which can be executed at a high speed. In a compiling apparatus according to the present invention, an aliasing address comparison instruction generating unit inserts a instruction to compare the two memory addresses of each pair of data expressions whose overlap is judged to be obscure, generates a plurality of paths defined by combinations of conditions whether or not memory addresses of data expressions of each pair overlap, and generates a instruction to branch to one of the paths according to a comparison result obtained by the instruction in an execution of a compiled program, and an optimization unit for respectively optimizing the paths. When the object program is executed, one path corresponding to a practical condition is selected from the plurality of paths, and only the selected path is executed.

15 Claims, 14 Drawing Sheets

LOAD t1 x

LOAD t2 y

ADD t1,t2 → t3

STORE t3 A(1)

ADD t3, 1 → t4

STORE t4, x

```
#define MAX1 100
#define MAX2 200
sub_(aa_, bb_)
     float aa_[MAX1 + 1];
     float bb_[MAX2 + 1];
{
  extern float i_h_ws[MAX2][(MAX1 + 1)];
  register float *r, *w, *s, *end_s;
  float *end_x;

w=...;

*r = 0.0;
     s = &aa_[0];
     end_s= &aa_[MAX1];
     for (; s <= end_s; ) {
        *r += (*s++) * (*w++);
     }
        :
}
```

Fig. 6

DATA STRUCTURE OF LOOP INFORMATION

| | |
|---|---|
| A | INFORMATION INDICATING OUTER LOOPS |
| B | LIST OF INNER LOOPS |
| C | HEADER OF FUNDAMETAL BLOCKS CONSTITUTING LOOPS |
| D | LIST OF DATA WHICH REGULARLY INCREASE OR DECREASE IN LOOPS |
| E | LIST OF RESULTS OF STATICALLY ADDRESS OVERLAPS CHECKING OF PAIRS OF DATA EXPRESSIONS (ADDRESS OVERLAP LIST) |
| F | POINTERS TO NUMBERS OF LOOP CYCLES |
| G | ... (OTHERS) |

Fig.11

```
.L27
    ld      *s,%f3
    sub     %15,4,%15
    cmp     %15,%g0
    ld      *w,%f4
    fmuls   %f3,%f4,%f4
    ld      *r,%f2
    fadds   %f2,%f4,%f4
    st      %f4,*r
    ld      *(s+1),%f5
    ld      *(w+1),%f6
    fmuls   %f5,%f6,%f6
    fadds   %f4,%f6,%f6
    st      %f6,*r ld      *(s+2),%f7
    ld      *(w+2),%f8
    fmuls   %f7,%f8,%f8
    fadds   %f6,%f8,%f8
    st      %f8,*r ld      *(s+3),%f15
    add     %o7,16,%o7
    ld      *(w+3),%f16
    fmuls   %f15,%f16,%f16
    fadds   %f14,%f16,%f16
    st      %f16,*r
    bg      .L27
    add     %14,16,%14
```

Fig.12

```
.L27
    ld      *s,%f1
    sub     %14,4,%14
    cmp     %14,%g0
    ld      *w,%f3
    fmuls   %f1,%f3,%f3
    ld      *(s+1),%f4
    ld      *(w+1),%f5
    fmuls   %f4,%f5,%f5
    fadds   %f2,%f3,%f2
    ld      *(s+2),%f6
    ld      *(w+2),%f7
    fmuls   %f6,%f7,%f7
    fadds   %f2,%f5,%f2
    ld      *(s+3),%f16
    add     %o7,16,%o7
    ld      *(w+3),%f17
    fmuls   %f16,%f17,%f17
    fadds   %f2,%f7,%f7
    fadds   %f2,%f17,%f2
    bg      .L27
    add     %13,16,%13
```

Fig.13A

|     |       |                |
|-----|-------|----------------|
|     | ld    | *s,%f3         |
| 1   | sub   | %l5,4,%l5      |
| 2   | cmp   | %l5,%g0        |
|     | ld    | *w,%f4         |
| 3   | fmuls | %f3,%f4,%f4    |
|     | ld    | *r,%f2         |
| 4   | stall |                |
| 5   | stall |                |
| 6   | fadds | %f2,%f4,%f4    |
| 7   | stall |                |
| 8   | stall |                |
| 9   | st    | %f4,*r         |
| 10  | ld    | *(s+1),%f5     |
| 11  | ld    | *(w+1),%f6     |
| 12  | fmuls | %f5,%f6,%f6    |
| 13  | stall |                |
| 14  | stall |                |
| 15  | fadds | %f4,%f6,%f6    |
| 16  | stall |                |
| 17  | stall |                |
| 18  | st    | %f6,*r         |
| 19  | ld    | *(s+2),%f7     |

Fig.13B

| | | |
|---|---|---|
| 20 | ld | *(w+2),%f8 |
| 21 | fmuls | %f7,%f8,%f8 |
| 22 | stall | |
| 23 | stall | |
| 24 | fadds | %f6,%f8,%f8 |
| 25 | stall | |
| 26 | stall | |
| 27 | st | %f8,*r |
| 28 | ld<br>add | *(s+3),%f15<br>%o7,%16,%o7 |
| 29 | ld | *(w+3),%f16 |
| 30 | fmuls | %f15,%f16,%f16 |
| 31 | stall | |
| 32 | stall | |
| 33 | fadds | %f14,%f16,%f16 |
| 34 | stall | |
| 35 | stall | |
| 36 | st<br>bg | %f16,*r<br>.L27 |
| 37 | add | %f14,16,%f14 |

Fig. 14

| | | |
|---|---|---|
| 1 | ld | *s,%f1 |
|   | sub | %l4,4,%l4 |
| 2 | cmp | %l4,%g0 |
|   | ld | *w,%f3 |
| 3 | fmuls | %f1,%f3,%f3 |
|   | ld | *(s+1),%f4 |
| 4 | ld | *(w+1),%f5 |
| 5 | fmuls | %f4,%f5,%f5 |
| 6 | fadds | %f2,%f3,%f2 |
|   | ld | *(s+2),%f6 |
| 7 | ld | *(w+2),%f7 |
| 8 | fmuls | %f6,%f7,%f7 |
| 9 | fadds | %f2,%f5,%f2 |
|   | ld | *(s+3),%f16 |
|   | add | %o7,16,%o7 |
| 10 | ld | *(w+3),%f17 |
| 11 | fmuls | %f16,%f17,%f17 |
| 12 | fadds | %f2,%f7,%f2 |
| 13 | stall | |
| 14 | stall | |
| 15 | fadds | %f2,%f17,%f2 |
|   | bg | .L27 |
| 16 | add | %l3,%f16,%l3 |

COMPILING APPARATUS HAVING A FUNCTION TO ANALYZE OVERLAPS OF MEMORY ADDRESSES OF TWO OR MORE DATA EXPRESSIONS AND A COMPILING METHOD

BACKGROUND OF THE INVENTION

(1) Field of the Invention

The present invention relates to a compiling apparatus for converting a source program into its machine language or assembly language equivalent which can be executed at a high speed. More particularly, the invention relates to a compiling apparatus which has a function to analyze overlaps of memory addresses of two or more data expressions and a function to optimize code of the object program.

In the following, the compiling apparatus is called a compiler. Compilers translate source programs written in a high-order programming language such as C, FORTRAN, AND COBOL into object programs written in machine oriented language such as machine language, assembly language.

A term intermediate language is one used by the compiler to represent the program being compiled. It is usually at a lower level than the source language and a higher level than the target language. Generally, compilers optimize a source program through intermediate language programs, which are synonymous with intermediate representations, intermediate texts, or internal representations.

The "optimization" of compiling means to compile a source program in such a way as to improve the execution speed of the compiled program and reduce the memory area required by the compiled program, without changing the meaning of the source program. Some of representations of intermediate language program are eliminated, moved, and integrated through optimization, to thereby provide optimized object program. The selection of representations of intermediate language program which are optimized, therefore, affects the performance and speed of optimization.

Computers are now required to operate at high speed. To improve the operation speed, the number of machine cycles per second of the computers are increased. However, an increase in the number of machine cycles generally involves a very high cost. Therefore, computers that simultaneously execute a plurality of instructions, namely, parallel processing computers have been attracting attention as computers which offer a high operating speed. In order to realize a practical improvement in the total speed of the above computers, an improvement in compilers is important. Therefore, the improvement of the optimization function of the compilers is further required. However, the present invention can be applied not only to the compiler of parallel processing computers but also to the compiler of normal computers.

(2) Description of the Related Art

In programs, data is pointed to by variables and arrays. Names of variables and arrays in the source program are converted into addresses indicating memory positions at which corresponding variables and arrays are stored. In many recent programs, variables which directly point to addresses indicating memory positions are used. These variables are called "pointers". In this way, data expressed by variables, arrays, and pointers are mapped to a real memory address area.

It can occur that two or more data expressions of such variables, arrays, and pointers denote the same memory address. This means that different data pointed by two or more data expressions overlap one another. If the data expressions are in the above case, we say that the expressions are aliases of one another.

The overlaps of data expressions influence the optimization. For example, when two memory addresses of data expressions indicated by two assignment statements overlap each other, data accessed by the former assignment statement does not need to be accessed once more by the later assignment statement because these data are same. Therefore, the later assignment statement can be omitted. Further, if two memory addresses of data expressions overlap each other, when data pointed to by one expression changes, data pointed to by the other expression also changes. For example, when the first one of the overlapping pointers indicates a constant memory address, the value pointed to by the first pointer is sequentially rewritten according to the value pointed to by the second pointer, and the final value pointed to by the first pointer is necessary, the value pointed to by the first pointer needs to be stored after every rewriting operation because the value pointed to by the second pointer is necessary to be rewritten when the first and second pointers point same addresses. However, when memory addresses of two data expressions do not overlap each other, the value pointed to by the first pointer does not need to be stored after every rewriting operation because the rewritten value pointed to by the first pointer does not influence the values pointed to by the second pointer, and only the final value pointed to by the first pointer is necessary. Namely, in this case, when memory addresses of two data expressions do not overlap each other, the storing statements to store the value pointed by the first pointer can be omitted. As described above, it is important for the optimization to know whether or not memory addresses of two or more data expressions overlap.

Scheduling of the program is carried out as a part of the optimization in a broad sense. The scheduling of the program is also influenced by the overlaps of data expressions.

Recent compiling apparatuses usually provide a functional portion to statically analyze overlaps of memory addresses of two or more data expressions. This functional portion is called a static aliasing analysis unit.

Many studies to develop static aliasing analysis methods have been made for many kinds of compilers. For example, the following documents disclose such compilers.

(1) "Compiler Principles, Techniques, and Tools" (A. V.Aho, et al. Addison-Wesley 1988);

(2) "Dependence Analysis for Pointer Variables" (Susan Horwitz, et al. ACM 0-89791-306-X 1989);

(3) "A Safe Approximate Algorithm for Interprocedual Pointer Aliasing" (William Landi, et al. ACM SIGPLAN '92 PLDI-6/92/CA 1992); and (4) Japanese Unexamined Patent Publication (Kokai) No.4-25942.

The static aliasing analysis methods of the conventional compilers disclosed in the above documents statically judge whether or not memory addresses of two or more data expressions overlap one another. This means that the analysis is superficially carried out without practically executing the programs. However, programs usually have portions in which overlaps of memory addresses of data expressions cannot be analyzed without practically executing the program. For example, when variables are passed as arguments, overlaps of memory addresses accessed by these variables cannot be analyzed without practical execution of the program. Further, when variables are indirectly expressed by a plurality of functions which call functions one after another, overlaps of memory addresses accessed by these variables are very complicated, therefore, the analysis of the overlaps of memory addresses is practically impossible because the analysis time required by the static aliasing analysis unit becomes very large. In this case, it is judged that the overlap of memory addresses of data expressions is obscure, and this portion of the program is excluded from the optimization process and the scheduling process. Therefore, there is a problem that the effect of optimization by this program is not enough.

If optimization and scheduling can be applied to data expressions which are judged to have obscure overlaps, more efficient object program can be obtained.

In some conventional compiling methods such as Fujitsu Fortran 77 EX/VP, an user can indicate existence of overlaps of memory addresses of data by inserting compile statements into the source program, and the compiler carries out the optimization process and the scheduling process according to these indications. However, these compiling methods have problems in that they are not automatic.

SUMMARY OF THE INVENTION

An object of the present invention is to realize a compiling apparatus which can carry out the optimization of data expressions whose overlaps are judged to be obscure, and can output a more efficient object program.

The compiling apparatus according to the present invention comprises a structure analysis unit which analyzes the structure of an intermediate language program of a source program output from a front end unit, and recognizes program units constituting loops; a data flow analysis unit which analyzes the scope of declarations, and so forth, of respective data expressions in the loop units; a static aliasing analysis unit, which statically analyzes an overlap of two memory addresses of data expressions of each pair and outputs the overlap analysis result of each pair, whose result is one of whether the two memory addresses overlap each other, the two memory addresses do not overlap each other, or the overlap of the two memory addresses is obscure; and an optimization unit which optimizes the intermediate language program of the source program, and the compiling apparatus of the present invention further comprises an aliasing address comparison instruction generating unit which generates a instruction to compare the two memory addresses of data expressions of each pair whose overlap is judged to be obscure by the static memory data analysis unit, generates a plurality of paths defined by combinations of conditions whether or not two memory addresses of data expressions overlap of each pair, and generates a instruction to branch to one of the paths according to a comparison result obtained by the instruction when object program compiled from the source program is to be executed, and the optimization unit respectively optimizes the plurality of paths generated by the aliasing address comparison instruction generating unit.

In the object program compiled by the compiling apparatus according to the present invention, each path is fully optimized because the overlap of memory addresses for each data expression is not obscure. When the object program is executed, one path corresponding to a practical condition is selected from the plurality of paths, and only the selected path is executed. Therefore, the execution speed of the object program can be improved.

Although the aliasing address comparison instruction generating unit can carry out its operations on every pair of data expressions which are judged to be obscure, the aliasing address comparison instruction generating unit may carry out its operations only on some of pairs of data expressions whose overlaps are judged to be obscure.

When the present invention is applied to pairs of data expressions in loop units, the effect of the optimization is high. Therefore, the aliasing address comparison instruction generating unit may carry out its operations only on pairs of data expressions in the loop units. Further, when the aliasing address comparison instruction generating unit may carry out its operations only on pairs of data expressions in the innermost loops, the effect of the optimization becomes higher.

BRIEF DESCRIPTION OF THE DRAWINGS

The present invention will be more clearly understood from the description as set forth below with reference to the accompanying drawings, wherein:

FIGS. 1A and 1B are diagrams for explaining an overlap of array data;

FIG. 2 is a diagram showing another example of a program;

FIG. 4 is a diagram showing a program translated in the embodiment;

FIG. 6 is a diagram showing the data structure of loop information;

FIG. 11 is diagram showing an assembly language program (code) obtained in a path in which memory addresses of data expressions of every pair overlap each other;

FIG. 12 is diagram showing an assembly language program obtained in a path in which memory addresses of data expressions of neither pair overlap each other;

FIGS. 13A and 13B are diagrams explaining executing processes of the program shown in FIG. 11;

FIG. 14 is a diagram explaining executing processes of the program shown in FIG. 12.

DESCRIPTION OF THE PREFERRED EMBODIMENTS

Before proceeding to a detailed description of the preferred embodiments of the present invention, the overlap of data expressions will be described.

FIGS. 1A and 1B are diagrams for explaining an overlap of array data. FIG. 1A shows a source program, and FIG. 1B shows an assembly program generated from the program shown in FIG. 1A.

In the program shown in FIG. 1A, two arrays A(I), A(J) are defined. In FIG. 1B, tn (n; 1 to 5) indicates an n-th register. Although A(I) and A(J) appear to point to two different data, the two data are judged to overlap in a real memory area because I is equal to J. Therefore, in the program shown in FIG. 1B, a step to load A(J) is omitted.

FIG. 2 is a diagram showing an example of a program. This program shows a function f(I,J) in which calculations A(I)=x+y and z=A(J)+1 are carried out according to pairs of values of I and J. In the example shown in FIG. 2, because a condition such as I=J=1 shown in FIG. 1A is not provided, it is impossible to judge whether or not A(I) and A(J) overlap each other. For example, when f(I,J) is f(1,1), A(I) is same to A(J), namely, A(I) and A(J) overlap each other in the real memory area. However, when f(I,J) is f(1,3), A(I) is different from A(J), namely, A(I) and A(J) do not overlap each other in the real memory area.

In the example shown in FIG. 2, I and J are passed as arguments from the function and so forth which calls this function f(I,J). The conventional compiler executes compiling operations without taking information such as arguments into consideration, therefore, it is impossible to judge whether I and J are same. Consequently, when the program shown in FIG. 2 is compiled, the overlap of A(I) and A(J) cannot be judged, then, the judgement result of the overlap of A(I) and A(J) is made to be obscure.

Further, when variables are pointed to by a plurality of functions which call following functions one after another, analyses of overlaps of memory addresses of these variables are very complicated. Therefore, the conventional compiler stops the analysis of the overlaps of data because the analysis time becomes too long.

Alternatively, when the overlap analysis of the data expressions is impossible, it is judged that the overlap of the data expressions is obscure, and this pair of data expressions in the program is excluded from the optimization process and the scheduling process.

Although the example in which variables directly overlap are described in the above explanation, data expressions whose memory addresses pointed by the pointers also overlap in the same way.

Figure 3:
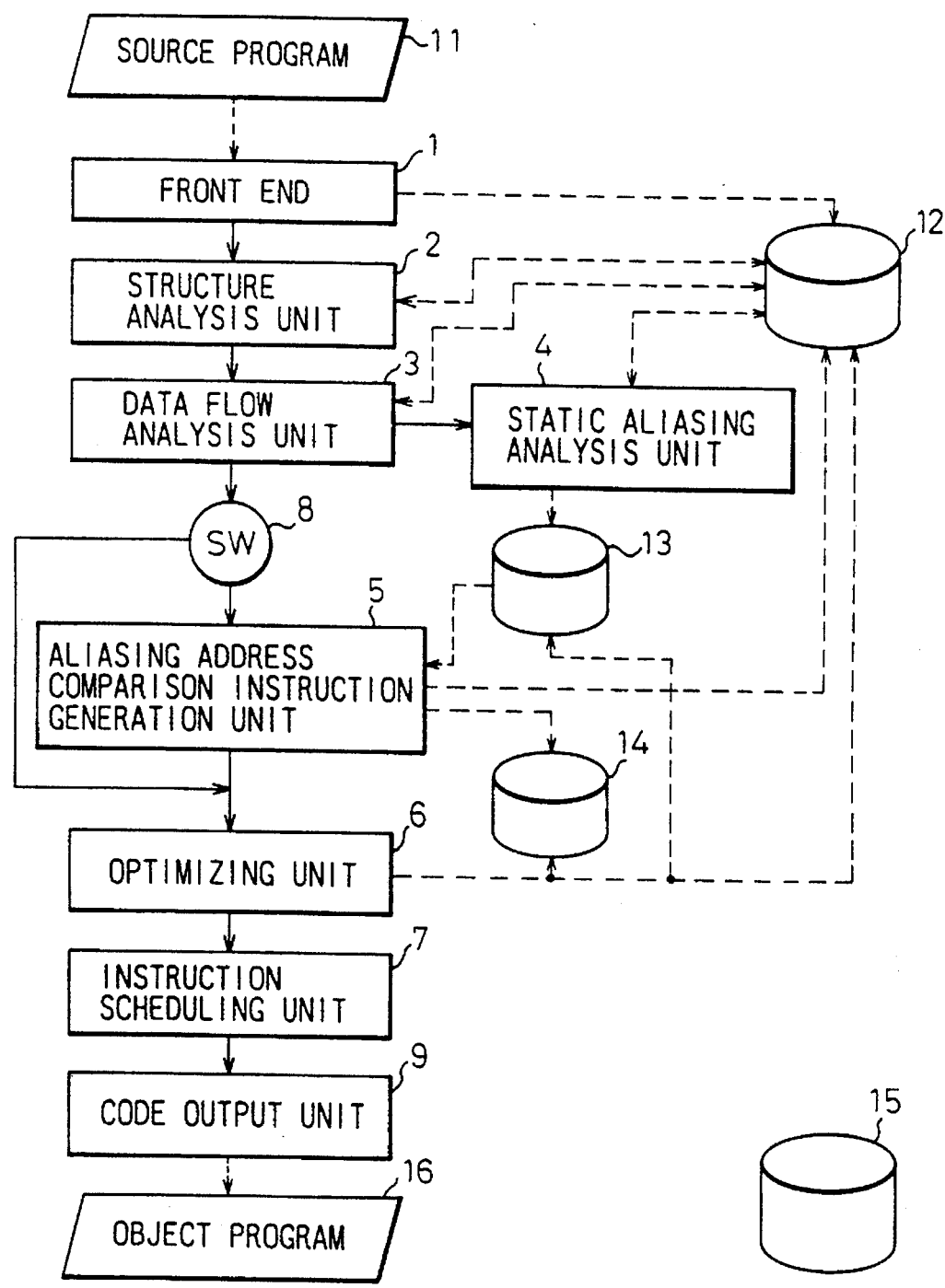
FIG. 3 is a diagram showing a constitution of a compiling apparatus of an embodiment according to the present invention.

FIG. 3 is a diagram showing a constitution of a compiling apparatus of an embodiment according to the present invention.

In FIG. 3, reference 11 indicates a source program; 1 indicates a front end; 2 indicates a structure analysis unit; 3 indicates a data flow analysis unit; 4 indicates a static aliasing analysis unit; 5 indicates an aliasing address comparison instruction generating unit; 6 indicates an optimizing unit; 7 indicates an instruction scheduling unit; 8 indicates a compiler switch; 9 indicates a code output unit; 12 to 15 indicate data files; and 16 indicates an object program. The file 15 stores softwares respectively corresponding to every unit of the compiling apparatus.

The front end 1 provides intermediate language program according to the source program 11 and stores the intermediate language program of the source program 11 into the intermediate language code file 12. The structure analysis unit 2 analyzes the structure of the intermediate language program stored in the file 12 and recognizes program units constituting loops. The data flow analysis unit 3 analyzes the scope of declarations and so forth of respective data expressions in respective loops recognized by the structure analysis unit 2, and analyzes whether each data expression is constant, regularly increases, or regularly decreases in each loop. When the compiler switch 8 is turned on, information analyzed in the data flow analysis unit 3 are supplied to the static aliasing analysis unit 4. The static aliasing analysis unit 4 statically analyzes overlaps of memory addresses of data expressions of each pair and outputs the overlap analysis result for each data pair when the two memory addresses overlap, the two memory addresses do not overlap, or the overlap of the two memory addresses is obscure. These analysis results are stored in the static analysis file 13.

When the compiler switch 8 is turned off, information analyzed in the data flow analysis unit 3 are directly supplied to the optimizing unit 6. The optimizing unit 6 and the instrcution scheduling unit 7 optimizes the intermediate language program stored in the file 12 without referring to the information analyzed by the static aliasing analysis unit 4. Namely, the optimization is not carried out on the aliasing data expressions. This case corresponds to operations of the most basic compiler.

When the compiler switch 8 is turned on, the optimizing unit 6 and the instruction scheduling unit 7 optimizes the intermediate language program stored in the file 12 according to the information stored in the file 13 which are analysis results by the static aliasing analysis unit 4. Namely, the optimization is carried on to the aliasing data expressions which can be statically analyzed. This case corresponds to operations disclosed in the prescribed documents.

In this embodiment, the aliasing address comparison instruction generation unit 5 is newly provided. The aliasing address comparison instruction generation unit 5 accesses and recognizes pairs of data expressions whose overlaps are judged to be obscure by the static aliasing analysis unit 4. On these pairs of data expressions, the aliasing address comparison instruction generation unit 5 generates instructions written in intermediate language to execute judgements whether or not these pairs of data expressions overlap each other, and copies a plurality of paths each of which includes an intermediate language text same to that of the portion of the intermediate language program including those data expressions. The number of the paths is determined by a number of pairs of data expressions whose overlaps are judged to be obscure at that program portion. For example, when the number of pairs of data expressions whose overlaps are judged to be obscure at that program portion is n, the number of the paths is $2^n$. The paths are divided according to combinations of conditions of whether or not data expressions of each pair overlap each other, and the judgement result of each path is changed from "obscure" to "agree" or "disagree" according to conditions of the above cases. Further, the aliasing address comparison instruction generation unit 5 generates a instruction to branch to one of the paths according to the overlap judgement result in the execution of the program. The aliasing address comparison instruction generation unit 5 stores the intermediate language texts to execute judgements, the corresponding portions of the intermediate language program and the branch instructions to the paths into the file 14.

The optimizing unit 6 optimizes the intermediate language program stored in the file 12 by referring to the information stored in the files 13 and 14. Namely, the optimization is also carried out on the aliasing data expressions whose overlaps are judged to be obscure. The optimization is respectively carried out on each path according to the conditions defined as the judgement result. The instruction scheduling unit 7 also carries out scheduling processes by referring to the information stored in the files 13 and 14. Therefore, in each path, the optimization and the scheduling can be effectively carried out. In this way, the effects of the optimization and the scheduling can be improved.

In the following, an embodiment in which a program shown in FIG. 4 is compiled using the compiling apparatus shown in FIG. 3 will be explained.

The program shown in FIG. 4 is a source program written in C language. In FIG. 4, portions of the first five lines indicate definition statements which respectively define constants MAX1, MAX2, a function sub-(aa-, bb-), and arrays aa-[MAX1+1], bb-[MAX2+1]. Portions of next three lines also indicate definition statements which respectively define an array i-h-ws[MAX2][(MAX1+1)], pointers *r, *w, *s, *end-s, *end-r. Next, contents of variables w, s, end-s corresponding to the pointers and the pointer *r are defined. Further, a "for" loop statement is defined.

Figure 5:
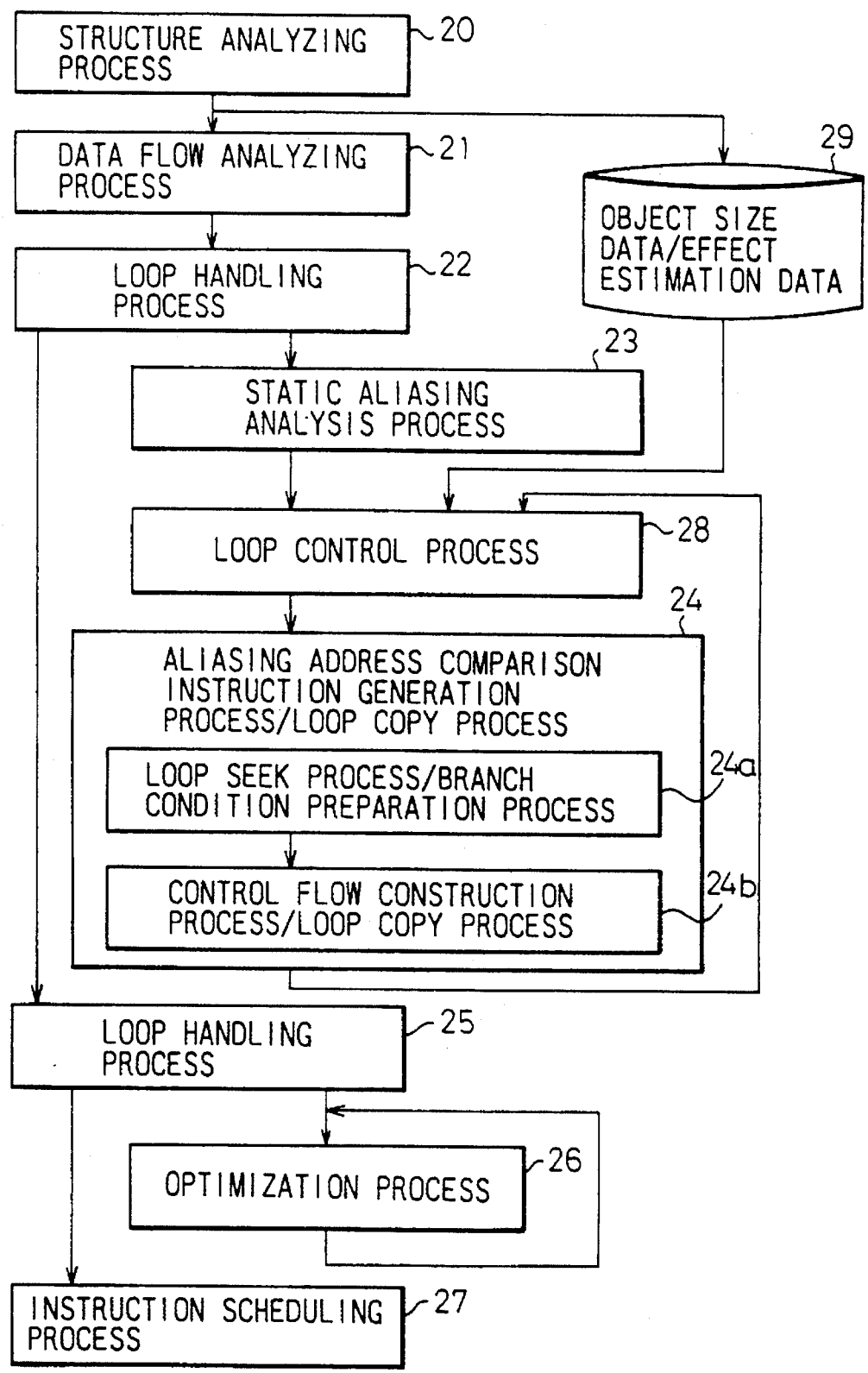
FIG. 5 is a flow-chart showing operations of the embodiment.

FIG. 5 is a flow-chart showing operations of this embodiment.

The optimization is respectively applied to every loop, sub-program, and so forth. The effects of the optimization are expected to be high when the optimization are applied to loops. Therefore, in this embodiment, an example in which the present invention is applied to the loop shown in FIG. 4 will be explained.

In FIG. 5, reference 20 indicates a structure analyzing process; 21 indicates a data flow analyzing process; 22 indicates a loop handling process; 23 indicates a static aliasing analysis process; 24 indicates an aliasing address comparison instruction generation process/loop copy process; 25 indicates a loop handling process; 26 indicates an optimization process; 27 indicates a instruction scheduling process; 28 indicates a loop control process for controlling the repeat of the aliasing address comparison instruction generation process/loop copy process. Reference 29 indicates a file for storing object size data and effect estimation data. The above processes 20, 21, 26, and 27 respectively correspond to operations carried out in the units 2, 3, 6, and 7 shown in FIG. 3, and the functions of these units are provided in conventional compiling apparatus.

The compiler can estimate a size of object codes and a compiling time of each loop according to a quantity of intermediate language program in the structure analyzing process 20. By comparing the object size and the compiling time, effects of generating a plurality of paths to pairs of data expressions whose overlaps are obscure can be estimated. These estimation results are stored in the file 29.

The aliasing address comparison instruction generation process/loop copy process 24 is a process characteristic to the present invention, and it consists of two processes 24a and 24b. In the process 24a, loops to be processed in the process 24 are sought, and branch conditions to be inserted are prepared. In the process 24b, control flows are constructed, and loop programs are copied.

Next, operational flows will be explained. The structure analyzing process 20 receives intermediate language program of the source program from the front end, and analyzes the structure of the intermediate language program including loops. By this analysis, loop information for the program is obtained and stored in the file (the file 12 shown in FIG. 12).

In the data flow analyzing process 21, data expressions whose memory addresses are constant, regularly increase, or regularly decrease in each loop are recognized. The data expressions *r, *s, *w in the program shown in FIG. 4 are recognized as that memory addresses of *s and *w regularly change, and *r is constant.

When loops are detected in the loop handling process 22, the processes 23 and 24 are respectively activated for each loop. The static aliasing analysis process 23 statically judges the overlaps of data expressions of each pair in each loop, and classifies pairs of data expressions into three groups "agree", "disagree", and "obscure". Combinations (*r *s), (*r, *w), (*s, *w) of the data expressions *r, *s, *w in the program shown in FIG. 4 are classified into "obscure". In this way, loop information is obtained.

FIG. 6 shows the data structure of loop information.

In FIG. 6, information indicated by characters A, B and C are obtained in the structure analyzing process 20. Information A indicates outer loops. Information B indicates a list of inner loops. Information C indicates headers of blocks constituting the loops. Information D which is obtained in the data flow analyzing process 21 indicates a list of data expressions which regularly increase or decrease. Information E, which is obtained in the static aliasing analysis process 23, indicates a list of aliasing judgement results of data expressions for each pair. Information F indicates pointers to numbers of loop cycles. The number of loop cycles cannot be known in the compiling operations, however, it can be calculated before the loop execution is started because a value of a variable which controls the number of the loop cycle is known to regularly change in the loop. The name of the variable which controls the number of the loop cycle can be obtained by the analyses of the loop structure in the structure analyzing process 20 and the data flow analyzing process 21. If necessary, the number of the loop cycles can be obtained by outputting a instruction to calculate the number of the loop cycle before execution. Reference G indicates information which does not directly relate to the present invention.

In FIG. 5, the aliasing address comparison instruction generation process/loop copy process 24 is activated in a sequence in the static aliasing analysis process 23 which is activated for each loop. In the aliasing address comparison instruction generation process/loop copy process 24, a loop seek process/branch condition preparation process 24a is carried out, then, a control flow construction process/loop copy process 24b is carried out. These processes will now be explained.

Figure 7:
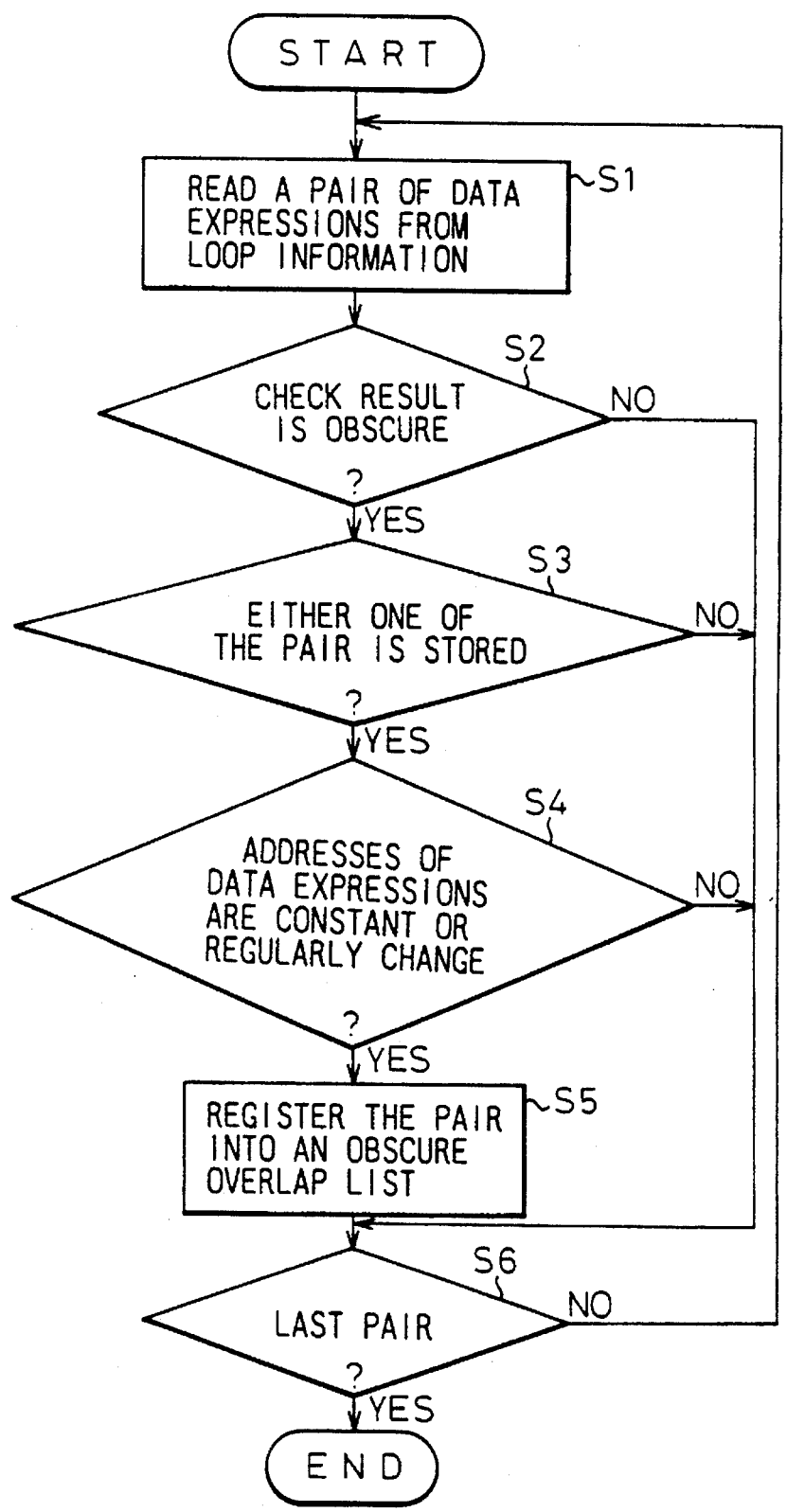
FIG. 7 is a flow-chart showing detailed operations of an aliasing address comparison instruction generation process/ loop copy process.

FIG. 7 is a flow-chart showing detailed operations of the aliasing address comparison instruction generation process/ loop copy process 24.

In step S1, a pair of data expressions is read from the loop information having a data structure shown in FIG. 6. In step S2, it is judged whether or not the static aliasing check result of data expressions of the pair is obscure. When the check result is not "obscure", namely, it is "agree" or "disagree", the control proceeds to step S6 because this process is applied only to "obscure" pairs. When the check result is "obscure", the control proceeds to step S3. In step S3, it is judged whether or not either of data expressions of the pair is stored. When neither of data expressions of the pair is stored, the contents of the data expressions do not change, therefore, these data expressions are omitted from this process. When either of the data expressions of the pair is stored, the control proceeds to step S4.

In step S4, it is judged whether or not memory addresses of data expressions of the pair are constant, or regularly change. When the memory addresses are not constant, or do not regularly change, it is impossible to check whether they overlap before the loop of the program is practically executed. Therefore, these data expressions are omitted from this process. When the result of step S4 is "YES", the control proceeds to step S5.

In step S5, the data expressions of the pair are registered in the list showing pairs of data expressions which are processed in the process 24b.

Step S6 is a step to judge whether or not all pairs of the data expressions are checked. When the result of step S6 is "NO", the control returns to step S1, and next pair is read from the list. In this way, every pair of data expressions are checked.

Figure 8:
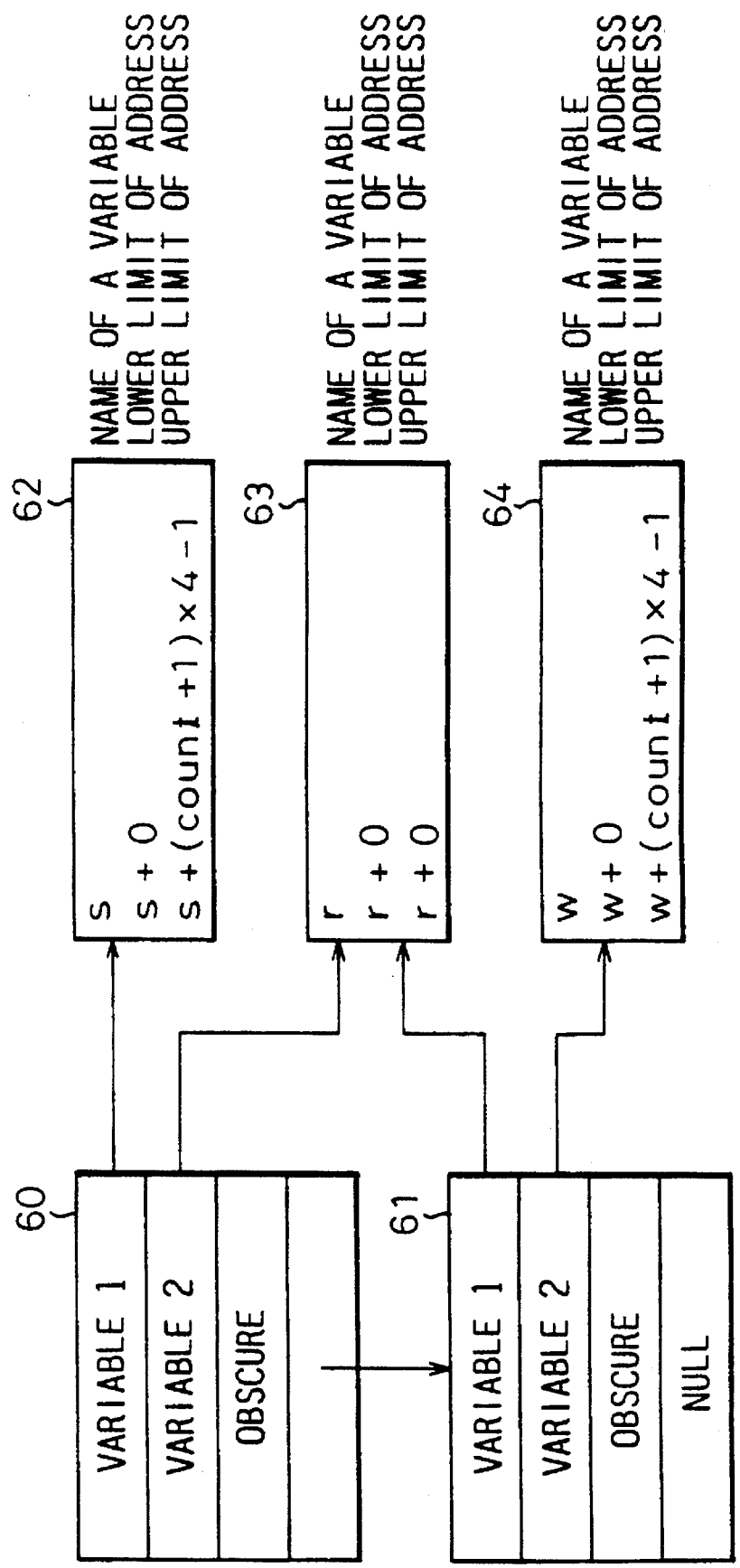
FIG. 8 is a list obtained by operations shown in FIG. 7 when the program shown in FIG. 4 is processed.

FIG. 8 is a list obtained by carrying out the operations shown in FIG. 7 on the program shown in FIG. 4. In FIG. 8, reference 60 and 61 indicate areas in which information relating to pairs of data expressions to be listed are stored. References 62 to 64 indicate areas in which information relating to respective data expressions included in the listed pairs are stored. As shown in FIG. 8, each set of information for areas 60 and 61 consists of a variable information 1, a variable information 2, and an information indicating that the static aliasing check result is "obscure". The variable information 1 is an address pointer which indicates a memory address at which information relating to the former data expression of the pair is stored. Similarly, the variable information 2 is an address pointer which indicates a memory address at which information relating to the latter data expression of the pair is stored. Information stored in each of the areas 62 to 64 consists of a name of the data expression and a range in which a memory address of the data expression changes. In the example shown in FIG. 8, a lower limit and an upper limit of memory addresses of the range are stored. The range of memory address of the data expression is determined according to a start value and a number of the loop cycles. The number of the loop cycles is indicated by "count" in FIG. 8. In the program shown in FIG. 8, s and w regularly increase 1 by 1. In this example, the memory addresses of s and w increase 4 by 4 because s and w are floating point variables having four byte lengthes. Therefore, the memory address of s and w change in the range shown in FIG. 8. However, r does not change in the loop, therefore, the upper limit and the lower limit of the memory address of r are same.

Figure 9:
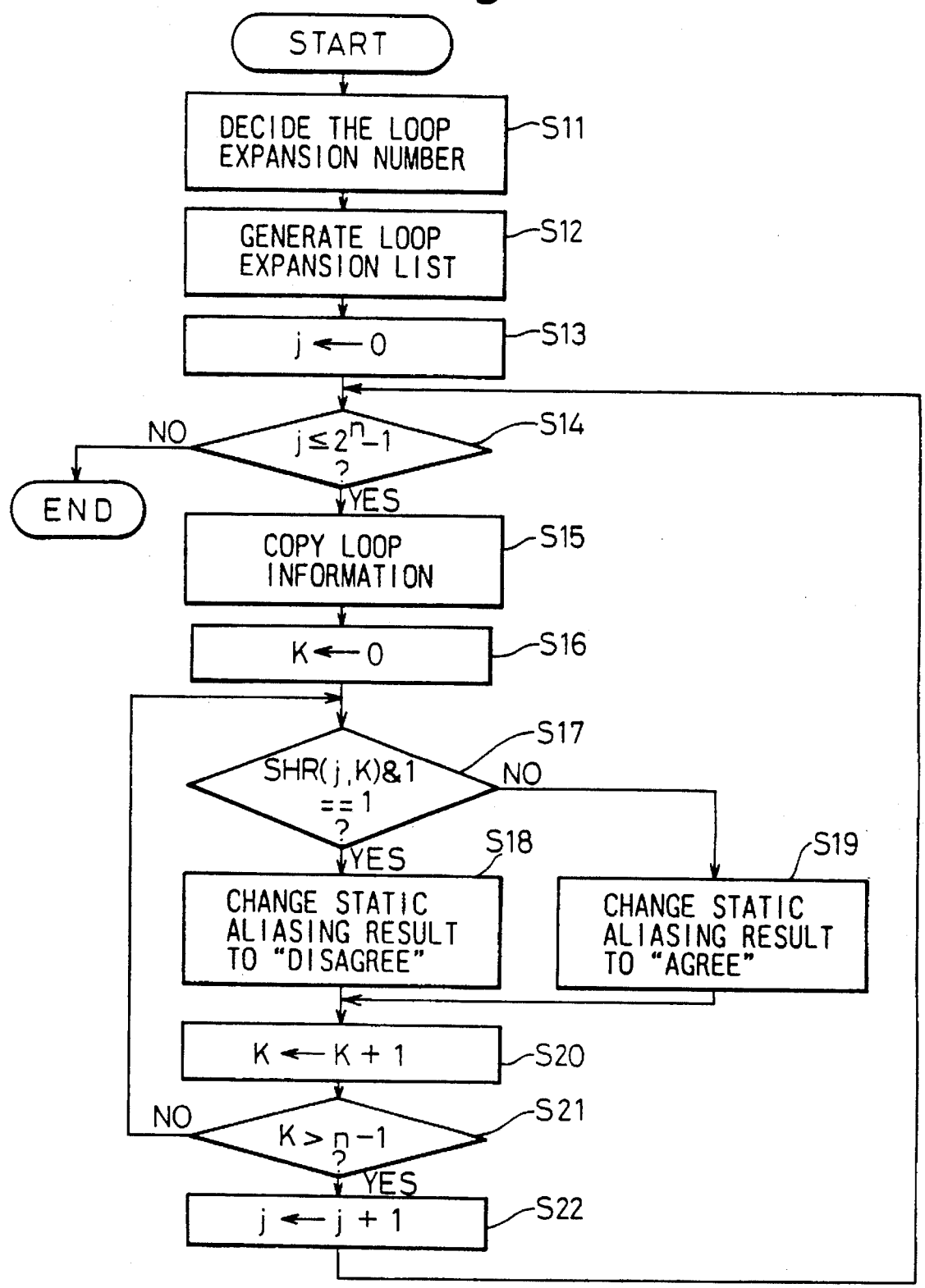
FIG. 9 is a flow-chart showing operations to generate expansion loops.

FIG. 9 is a flow-chart showing a part of operations in the control flow construction process/loop copy process 24b shown in FIG. 5.

The process shown in FIG. 9 is carried out on the data expressions in the list shown in FIG. 8 obtained by the process shown in FIG. 7, and, after the process shown in FIG. 9, a plurality of paths written in intermediate language are output. Expansion loops respectively represent the paths.

In step S11, an expansion loop number is determined. The expansion loop number is usually determined according to a total number of pairs of data expressions on the list shown in FIG. 8. Namely, when a number of pairs of data expressions on the list is n, the expansion loop number is usually $2^n$. As shown in FIG. 8, two pairs of (s, r) and (r, w) are registered in the list, therefore, the process of FIG. 9 is applied to only these pairs. Each pair can take two conditions whether or not two data expressions of the pair overlap each other. Therefore, in the combination of two pairs, there can be four conditions. Namely, these four conditions are "disagree" and "disagree", "disagree" and "agree", "agree" and "disagree", "agree" and "agree". However, as described later, a few of expansion loops in which the effects of the applications of the present invention, namely, the effect of generating a plurality of paths, are expected to be low can be omitted.

In step S12, a list of expansion loops is made by copying the list shown in FIG. 8 by $2^n$.

Steps S13 to S22 are operations to copy a plurality of expansion loops and to rewrite each expansion loop so that the judgement result of each expansion loop is changed from "obscure" to "agree" or "disagree".

In FIG. 9, a variable j represents the expansion loop number in the list, and a variable K represents the pair number in each expansion loop.

In step S13, j is initialized.

In step S14, it is judged whether or not rewriting operations are carried out in all expansion loops.

In step S15, loop information is copied.

In step S16, K is initialized.

In step S17, j which is expressed in binary code is shifted to lower side by K bits, and a bit-AND operation between j and 1 is carried out. According to this result, the static aliasing result of (K+1)th pair in each expansion loop is changed to from "obscure" to "disagree" or "agree" in step S18 or S19.

In steps S20 and S21, it is judged whether or not the static aliasing results of all pairs in each expansion loop are rewritten. In this way, steps S17 to S21 are repeated until the static aliasing results of all pairs are rewritten in each expansion loop.

In step S22, j is increased by 1, and the control returns to step S14. Steps S14 to S22 are repeated until rewriting operations are carried out in all expansion loops.

Figure 10:
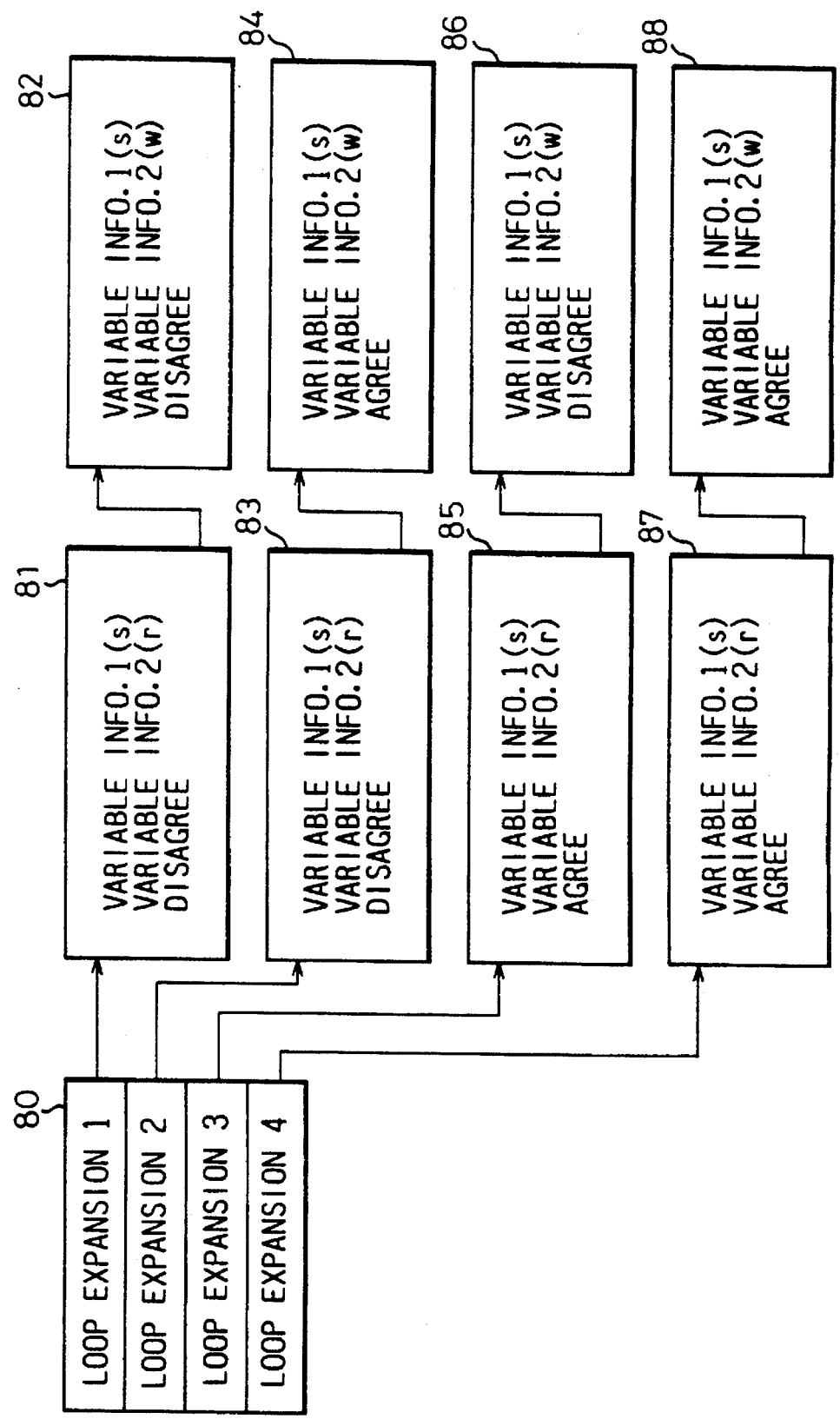
FIG. 10 is a diagram showing an expansion loop list.

FIG. 10 shows the loop expansion list obtained by applying the processes shown in FIG. 9 to the program shown in FIG. 4.

In FIG. 10, reference 80 indicates a table in which four expansion loops indicating combinations of conditions of data expressions are shown. Tables 81 and 82, 83 and 84, 85 and 86, 87 and 88 respectively correspond to each expansion loop, the tables 81, 83, 85, 87 respectively indicates the former pair (s, r) and its conditions whether or not two data expressions (s, r) overlap, and the tables 82, 84, 86, 88 respectively indicates the latter pair (r, w) and its conditions whether or not two data expressions (r, w) overlap.

Further, in the control flow construction process/loop copy process 24b, an instruction to check overlap conditions of pairs of data expressions on the list is generated, and an instruction to branch to one of the expansion loops according Go the above check result is generated. These instructions are inserted into the intermediate language program.

The branch conditions of the above instructions will be explained.

The branch conditions are determined according to changing conditions of the data expressions in each loop. An example in which the overlap of variables a and b is judged will be explained.

In this embodiment, the branch conditions are divided into three cases shown as follows.

(1) A first case is a condition in which two variable a and b regularly increase or decrease, but increment or decrement values of two variables are different, or start addresses of two variables are different although the increment or decrement values of two variables are same. This case is most common.

In this case, the aliasing judgement is available by checking whether or not the upper limit of memory address of either data expression is less than the lower limit of memory address of the other data expression. Namely, a condition expression of this case is shown in the following:

Condition=Low Address (a)>High Address (b)

OR

Condition=Low Address (b)>High Address (a)

(2) A second case is a condition in which memory addresses of both variables a and b are constant or increase or decrease in the same way. In this case, the overlap judgement is available only by checking whether or not the start addresses of both variables overlap each other. Namely, a condition expression of this case is shown in the following:

Condition=Low Address (a)<>High Address (b)

(3) A third case is a condition in which the memory address of either data expression is constant and the memory address of the other regularly increases or decreases. In this case, the overlap judgement is available by checking whether or not the constant memory address is within the range in which the other variable changes. Namely, a condition expression of this case is shown in the following:

Condition=Low Address (a)>High Address (b)

OR

Condition=Low Address (a)<High Address (b)

The data flow analyzing process 21 shown in FIG. 5 can classify the above cases, therefore, the above conditions are inserted into the intermediate language program according to the cases. When the program is executed, these conditions are judged, and one of the expansion loops is selected and executed.

In the above example, all expansion loops corresponding to all combinations of conditions of data expressions are generated, however, a part of the expansion loops can be omitted in consideration of the compile time, the object code size and so forth. A method to omit a part of the expansion loops will be explained in the following.

Pairs of data expressions to be expanded into a plurality of paths can be optionally determined by user, or can be automatically determined by each loop control process 28 according to data, estimated at the structure analyzing process 20, which are stored in the file 29 shown in FIG. 5. When a number of pairs of data expressions to be expanded is m, a number of expansion loops is $2^m$, and a number of tables in each expansion loop is m+1. In the last table, overlap conditions of data expressions which are not expanded are held to be "obscure".

Further, data expressions to be expanded are determined according to priorities of the expansion loops of data expressions which are previously determined.

Next, the effect of the present invention will be explained with reference to an assembly language program which is made by compiling the source program shown in FIG. 4.

FIG. 11 is an assembly language program showing a part of one expansion loop corresponding to a path for a condition that values of variable s and r may agree with each other in one or more cases, and variables r and w agree with each other in one or more cases. One operation (*r+=(*s++)*(*w++)) is repeated in the loop of the program shown in FIG. 4. However, in this embodiment, because the program is optimized for a particular computer which has pipe-lines, four operations each of which corresponds to the above repeating operation are sequentially carried out in a large loop, and this large loop is repeated. In FIG. 11, the assembly program corresponding to this large loop is shown, but a program to repeat this large loop is not shown. This operation is called "unrolling". Namely, in this example, four times unrolling operations are carried out.

FIG. 12 is an assembly language program showing one expansion loop corresponding to a path for a condition that values of variable s and r disagree with each other, and variables r and w disagree with each other.

In the program shown in FIG. 11, values of variable s and r may agree with each other, and variables r and w may agree with each other. The values pointed to by *r are sequentially rewritten according to the value pointed by *s and *w in the loop. In this program, all the values except the final value pointed to by *r are unnecessary. However, the values pointed to by *r need to be respectively stored after every rewriting operation because the values pointed to by *s and *w are rewritten by the rewriting of *r in the loop. Because the rewritten values pointed by *s and *w are used to point to *r, the values pointed by *s and *w need to be correctly rewritten. However, in the program shown in FIG. 12, because values of variable s and r disagree with each other and values of variables r and w disagree with each other, values pointed by *s and *w are not rewritten by the rewriting of *r in the loop. Therefore, the values pointed to by *r do not need to be stored after every rewriting operation. In this way, statements to store the value pointed to by *r can be omitted.

Now, it is assumed that the computer to execute this program completes an integer arithmetic in 1τ, completes a floating-point arithmetic in 3τ, and can execute arithmetic of two integers (only one integer when it is a memory arithmetic) and one floating-point arithmetic at one time. In this case, the program shown in FIG. 11 is executed as shown in FIGS. 13A and 13B, and the program shown in FIG. 12 is executed as shown in FIG. 14.

In FIGS. 13A, 13B and 14, "stall" means a stall of pine lines. As shown in FIGS. 13A and 13B, four unrolling operations of FIG. 11 are executed in 37τ, therefore, the execution time per one loop iteration operation is 9.25τ. However, four unrolling operations shown in FIG. 12 are executed in 16τ, therefore, an execution time per one loop iteration operation is 4τ. Namely, the operation speed of the program shown in FIG. 12 is 2.3 times of that of FIG. 11.

When a conventional compiler compiles the program shown in FIG. 4, it is judged to be obscure whether or not *s, *r and *w overlap one another. The optimization is carried out under the assumption that *s and *r, *r and *w may respectively overlap each other, therefore, the program shown in FIG. 11 is obtained. Regardless of practical overlap conditions of *s and *r, *r and *w, the program shown in FIG. 11 is carried out. Consequently, if *s and *r, *r and *w respectively overlap each other in the execution in practice, the operation speed of the program compiled by the conventional compiler will be almost same to that of the program compiled by the compiler of the present invention. However, if *s and *r, *r and *w do not respectively overlap one another in the execution in practice, the operation speed of the program compiled by the compiler of the present invention will be improved because the program shown in FIG. 12 is executed. Namely, by applying the present invention, the operation speed of the program shown in FIG. 4 can be improved when memory addresses of variables do not overlap.

As previously described, an user can optionally indicate states of overlaps of data expressions. However, these indications by the user can be different from practical overlapping states. A conventional compiling apparatus is constituted so as to insert a warning message to be output into the program when it is known that such states occur in execution.

However, when the program is compiled by the compiling apparatus according to the present invention, it is not desired to insert such a warning message because they disturb the optimization. In the present invention, discrimination marks are attached to pairs of data expressions which are indicated by the user whether or not they overlap. A plurality of paths are made to the pairs of data expressions having the discrimination marks in the way described above, and statements to output warning messages are inserted to paths different from the indication by the user. A conventional computer usually provides a routine to output warning messages in execution.

As described above, pairs of data expressions whose overlaps are judged to be obscure are omitted from the optimization in the conventional compiler. However, according to the present invention, a plurality of paths are respectively generated to pairs of data expressions whose overlap is judged to be obscure, and each path is fully optimized because the overlap of memory addresses of each data expressions is not obscure. Therefore, when the object program is executed, one path corresponding to a practical condition is selected from the plurality of paths, and only selected path is executed. Consequently, the execution speed of the object program can be improved.

We claim:

1. A compiling apparatus comprising:

a structure analysis unit for analyzing a structure of an intermediate language program of a source program output from a front-end unit, and for recognizing program units constituting loops;

a data flow analysis unit for analyzing a scope of declarations of respective data expressions in the loop units recognized at the structure analysis unit;

a static aliasing analysis unit for statically analyzing an overlap of two memory addresses of data expressions of each pair and for outputting an overlap analysis result of each pair which is whether the two memory addresses overlap each other, the two memory addresses do not overlap each other, or the overlap of the two memory addresses is obscure;

an aliasing address comparison instruction generating unit for inserting an instruction to compare the two memory addresses of data expressions of each pair whose overlap is judged to be obscure by the static memory data analysis unit, for generating a plurality of paths defined by combinations of conditions whether or not the two memory addresses of data expressions of each pair overlap, and for generating an instruction to branch to one of the plurality of paths according to a comparison result obtained by the instruction in an execution of a compiled program compiled from the source program; and an optimization unit for respectively optimizing the plurality of paths generated by the aliasing address comparison instruction generating unit.

2. A compiling apparatus as set forth in claim 1, wherein the operations of the aliasing address comparison instruction generating unit are partly carried out on pairs of data expressions whose overlaps are judged to be obscure.

3. A compiling apparatus as set forth in claim 2, wherein the operations of the aliasing address comparison instruction generating unit are carried out only on pairs of data expressions in the loops.

4. A compiling apparatus as set forth in claim 3, wherein the operations of the aliasing address comparison instruction generating unit are carried out only on pairs of data expressions in the innermost loops.

5. A compiling apparatus as set forth in claim 3, wherein the structure analysis unit and the data flow analysis unit generate information on loops, and the static aliasing analysis unit generates an aliasing obscure list of pairs of data expressions whose overlaps are statically judged to be obscure, the aliasing address comparison instruction generating unit comprises:

a loop seek process/branch condition preparation process which receives the aliasing obscure list, seeks loops to be processed by the aliasing address comparison instruction generating unit, and generates a processing loop list showing pairs of data expressions to be expanded into two paths in each loop; and a control flow construction process/loop copy process which determines a number of paths to be generated in each loop according to a number of pairs of data expressions to be expanded, generates an expansion loop list by copying the processing loop list by the number of paths, and rewrites judgement conditions made by the static aliasing analysis unit.

6. A compiling apparatus as set forth in claim 4, wherein the structure analysis unit and the data flow analysis unit generate information on loops, and the static aliasing analysis unit generates an aliasing obscure list of pairs of data expressions whose overlaps are statically judged to be obscure, the aliasing address comparison instruction generating unit comprises:

a loop seek process/branch condition preparation process which receives the aliasing obscure list, seeks loops to be processed by the aliasing address comparison instruction generating unit, and generates a processing loop list showing pairs of data expressions to be expanded into two paths in each loop; and a control flow construction process/loop copy process which determines the number of paths to be generated in each loop according to a number of pairs of data expressions to be expanded, generates an expansion loop list by copying the processing loop list by the number of paths, and rewrites judgement conditions made by the static aliasing analysis unit.

7. A compiling apparatus as set forth in claim 2, wherein the aliasing address comparison instruction generating unit comprises an effect judgement unit for judging whether the aliasing address comparison instruction generating unit should generate two paths to each pair of data expressions in consideration of a size of object program, compiling time, effect of optimization and so forth.

8. A compiling apparatus as set forth in claim 7, wherein the operations of the effect judgement unit are carried out only on pairs of data expressions in the loops.

9. A compiling apparatus as set forth in claim 8, wherein the operations of effect judgement unit are carried out only to pairs of data expressions in the innermost loops.

10. A compiling apparatus as set forth in claim 8, wherein the structure analysis unit and the data flow analysis unit generate information about loops, and the static aliasing analysis unit generates an aliasing obscure list of pairs of data expressions whose overlaps are statically judged to be obscure, the aliasing address comparison instruction generating unit comprises:

a loop seek process/branch condition preparation process which receives the aliasing obscure list, seeks loops to be processed by the aliasing address comparison instruction generating unit, and generates a processing loop list showing pairs of data expressions to be expanded into two paths in each loop; and a control flow construction process/loop copy process which determines the number of paths to be generated in each loop according to a number of pairs of data expressions to be expanded, generates an expansion loop list by copying the processing loop list by the number of paths, and rewrites judgement conditions made by the static aliasing analysis unit.

11. A compiling apparatus as set forth in claim 9, wherein the structure analysis unit and the data flow analysis unit generate information on loops, and the static aliasing analysis unit generates an aliasing obscure list of pairs of data expressions whose overlaps are statically judged to be obscure, the aliasing address comparison instruction generating unit comprises:

a loop seek process/branch condition preparation process which receives the aliasing obscure list, seeks loops to be processed by the aliasing address comparison instruction generating unit, and generates a processing loop list showing pairs of data expressions to be expanded into two paths in each loop; and a control flow construction process/loop copy process which determines the number of paths to be generated in each loop according to the number of pairs of data expressions to be expanded, generates an expansion loop list by copying the processing loop list by the number of paths, and rewrites the judgement conditions made by the static aliasing analysis unit.

12. A compiling apparatus as set forth in claim 2, wherein pairs of data expressions to which the operations of the aliasing address comparison instruction generating unit are carried out can be indicated by user.

13. A compiling apparatus as set forth in claim 12, wherein the aliasing address comparison instruction generating unit further insert instructions to output warning messages into paths which are different from the paths indicated by the user.

14. A compiling apparatus as set forth in claim 1, wherein the aliasing address comparison instruction generating unit generates a instruction to compare the two memory addresses according to changing conditions of data expressions made by the data flow analysis unit.

15. A compiling method comprising:

a structure analysis step for analyzing a structure of an intermediate language program of a source program output from a front-end step, and for recognizing program units constituting loops;

a data flow analysis step for analyzing a scope of declarations of respective data expressions in the loop units recognized at the structure analysis step;

a static aliasing analysis step for statically analyzing an overlap of two memory addresses of data expressions of each pair and for outputting an overlap analysis result of each pair which is whether the two memory addresses overlap each other, the two memory addresses do not overlap each other, or the overlap of the two memory addresses is obscure;

an aliasing address comparison instruction generating step for inserting an instruction to compare the two memory addresses of data expressions of each pair whose overlap is judged to be obscure by the static memory data analysis step, for generating a plurality of paths defined by combinations of two conditions whether or not the two memory addresses of data expressions of each pair overlap, and for generating an instruction to branch to one of the plurality of paths according to a comparison result obtained by the instruction in an execution of a program compiled from the source program; and an optimization step for respectively optimizing the plurality of paths generated by the aliasing address comparison instruction generating step.

* * * * *

UNITED STATES PATENT AND TRADEMARK OFFICE
CERTIFICATE OF CORRECTION

PATENT NO. : 5,581,762
DATED : December 3, 1996
INVENTOR(S) : Masakazu HAYASHI et al.

It is certified that error appears in the above-indentified patent and that said Letters Patent is hereby corrected as shown below:

Column 10, line 36, "Go" should be --to--.

Column 11, line 1, "<>" should be --< >--.

Signed and Sealed this

Twenty-fifth Day of February, 1997

Attest:

BRUCE LEHMAN

*Attesting Officer*    *Commissioner of Patents and Trademarks*